United States Patent [19]

Reamey

[11] Patent Number: 5,335,101
[45] Date of Patent: Aug. 2, 1994

[54] METHOD OF MAKING LIQUID CRYSTAL MATERIAL INCLUDING POLYMERIZING DISPERSION OF PREPOLYMER AND LIQUID CRYSTAL WHICH IS IMMISCIBLE IN THE PREPOLYMER

[75] Inventor: Robert H. Reamey, Palo Alto, Calif.

[73] Assignee: Raychem Corporation, Menlo Park, Calif.

[21] Appl. No.: 59,028

[22] Filed: May 6, 1993

[51] Int. Cl.$^5$ ............................................. G02F 1/13
[52] U.S. Cl. ................................... 359/52; 359/51
[58] Field of Search .................. 359/51, 52; 264/4.7, 264/4.1

[56] References Cited

U.S. PATENT DOCUMENTS

| | | | |
|---|---|---|---|
| 3,600,060 | 8/1971 | Churchill et al. | 350/160 |
| 3,720,623 | 3/1973 | Cartmell et al. | 252/316 |
| 3,872,050 | 3/1975 | Benton et al. | 260/37 |
| 3,935,337 | 1/1976 | Taylor | 427/180 |
| 4,101,207 | 7/1978 | Taylor | 350/344 |
| 4,182,700 | 1/1980 | Benton et al. | 260/37 |
| 4,246,302 | 1/1981 | Benton et al. | 428/1 |
| 4,435,047 | 3/1984 | Fergason | 350/334 |
| 4,616,903 | 10/1986 | Fergason | 350/334 |
| 4,671,618 | 6/1987 | Wu et al. | 350/347 |
| 4,673,255 | 6/1987 | West et al. | 350/347 |
| 4,685,771 | 8/1987 | West et al. | 350/347 |
| 4,688,900 | 8/1987 | Doane et al. | 350/347 |
| 4,728,547 | 3/1988 | Vaz et al. | 428/1 |
| 4,950,052 | 8/1990 | Fergason et al. | 350/334 |
| 4,992,201 | 2/1991 | Pearlman | 252/299.1 |
| 4,994,204 | 2/1991 | Doane et al. | 252/299.01 |
| 5,004,323 | 4/1991 | West | 350/346 |
| 5,015,057 | 5/1991 | Rumbaugh et al. | 359/51 |
| 5,056,898 | 10/1991 | Ma et al. | 359/94 |
| 5,138,472 | 8/1992 | Jones et al. | 359/51 |
| 5,150,232 | 9/1992 | Gunkima et al. | 359/53 |
| 5,233,445 | 8/1993 | Kamath et al. | 359/52 |

FOREIGN PATENT DOCUMENTS

0313053A2 4/1989 European Pat. Off. .
3-145626 6/1991 Japan .

OTHER PUBLICATIONS

Hirai et al., "Phase diagram and phase separation in LC/prepolymer mixture," SPIE vol. 1257 Liq. Cryst. Disp. and Appl'ns (1990), pp. 2–8.
Vaz et al., SPIE vol. 1455, Liquid Crystal Devices and Materials (1991), pp. 110–121 "Droplet Size Polydispersity in Polymer-Dispersed Liquid Crystal Films".

Primary Examiner—Anita P. Gross
Attorney, Agent, or Firm—Herbert G. Burkard; Yuan Chao

[57] ABSTRACT

An encapsulated liquid crystal material which comprises a liquid crystal composition dispersed in a containment medium and is responsive to an applied electric field to transform from a first visual state to a second visual state is made by: (a) providing a liquid crystal composition having an ordinary and an extraordinary refractive index; (b) providing a prepolymer material in which the liquid crystal composition is substantially immiscible and which is polymerizable into a containment medium having a refractive index which is substantially matched with the ordinary refractive index of the liquid crystal composition; (c) forming a dispersion of the liquid crystal composition in the prepolymer material, the dispersion having a mean volume diameter of less than 20 μm; and (d) polymerizing the prepolymer material to form the encapsulated liquid crystal material.

15 Claims, 3 Drawing Sheets

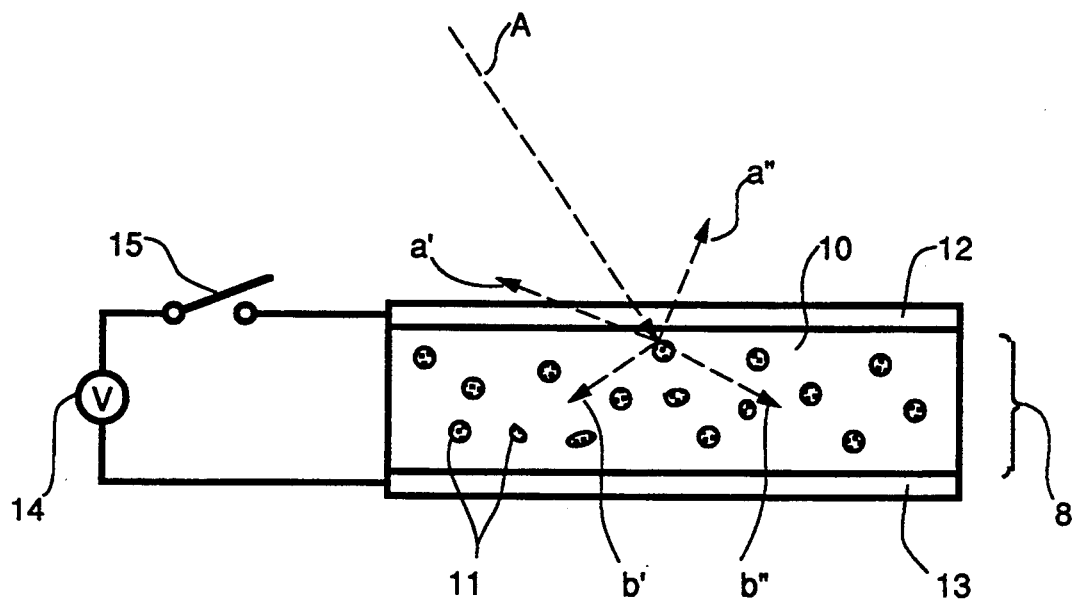
FIG_1a
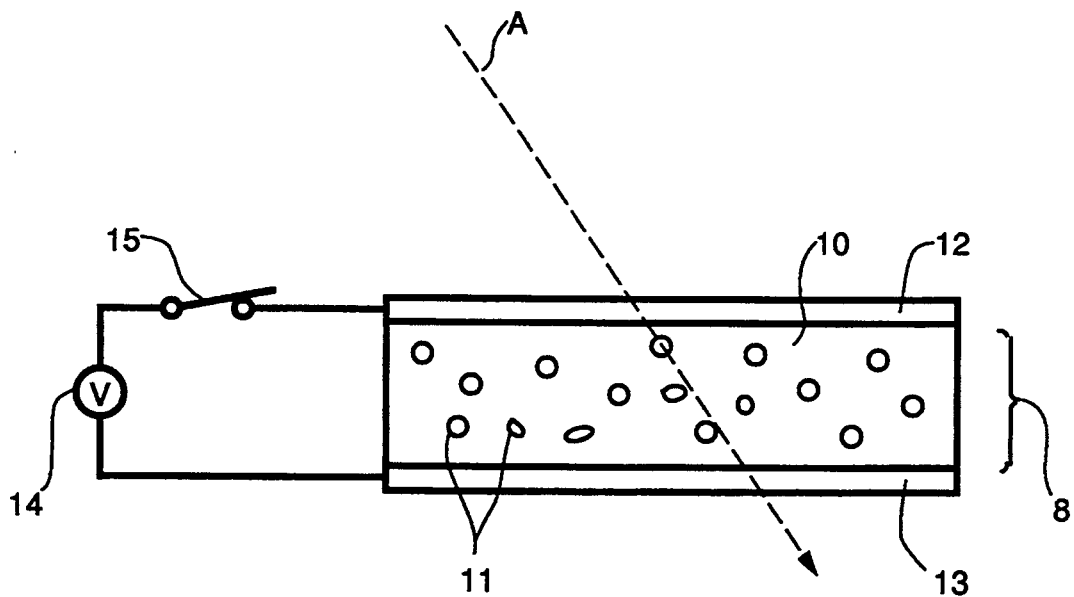
FIG_1b

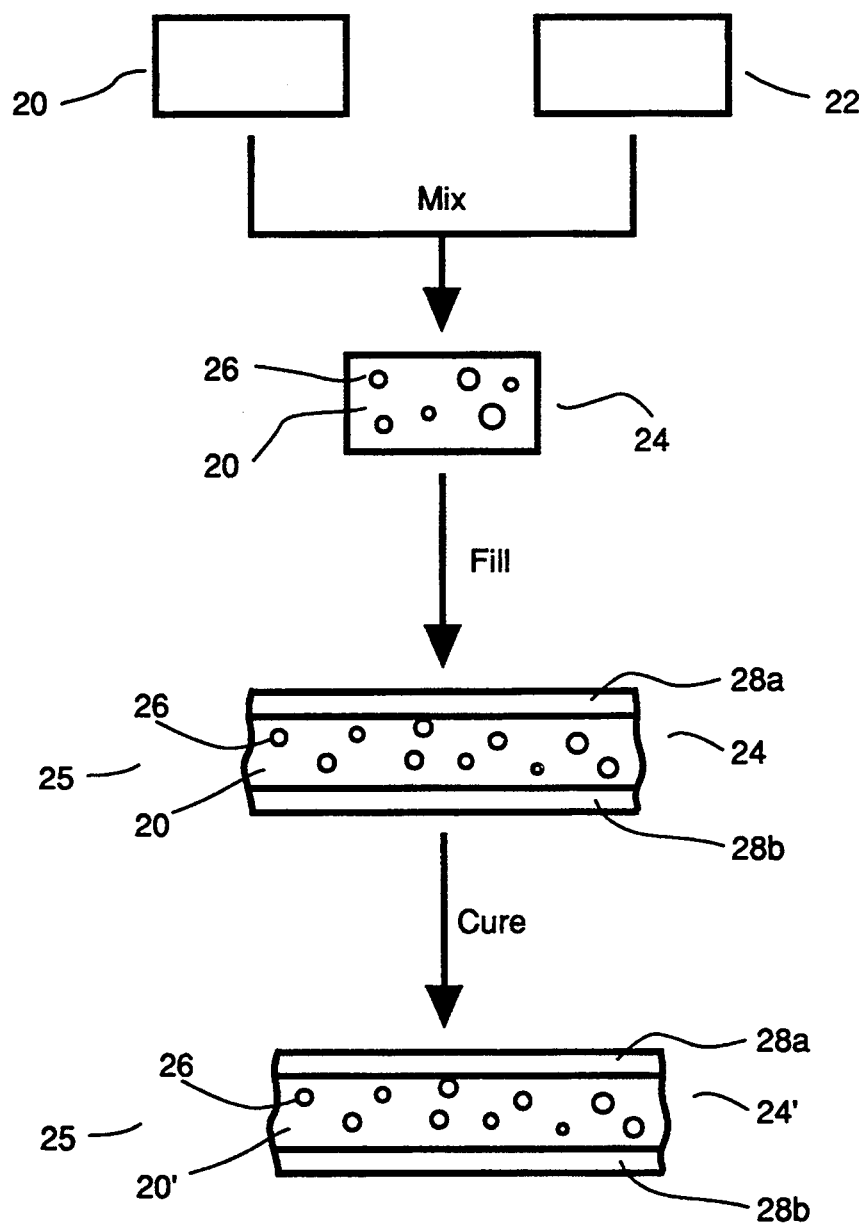
Fig_2

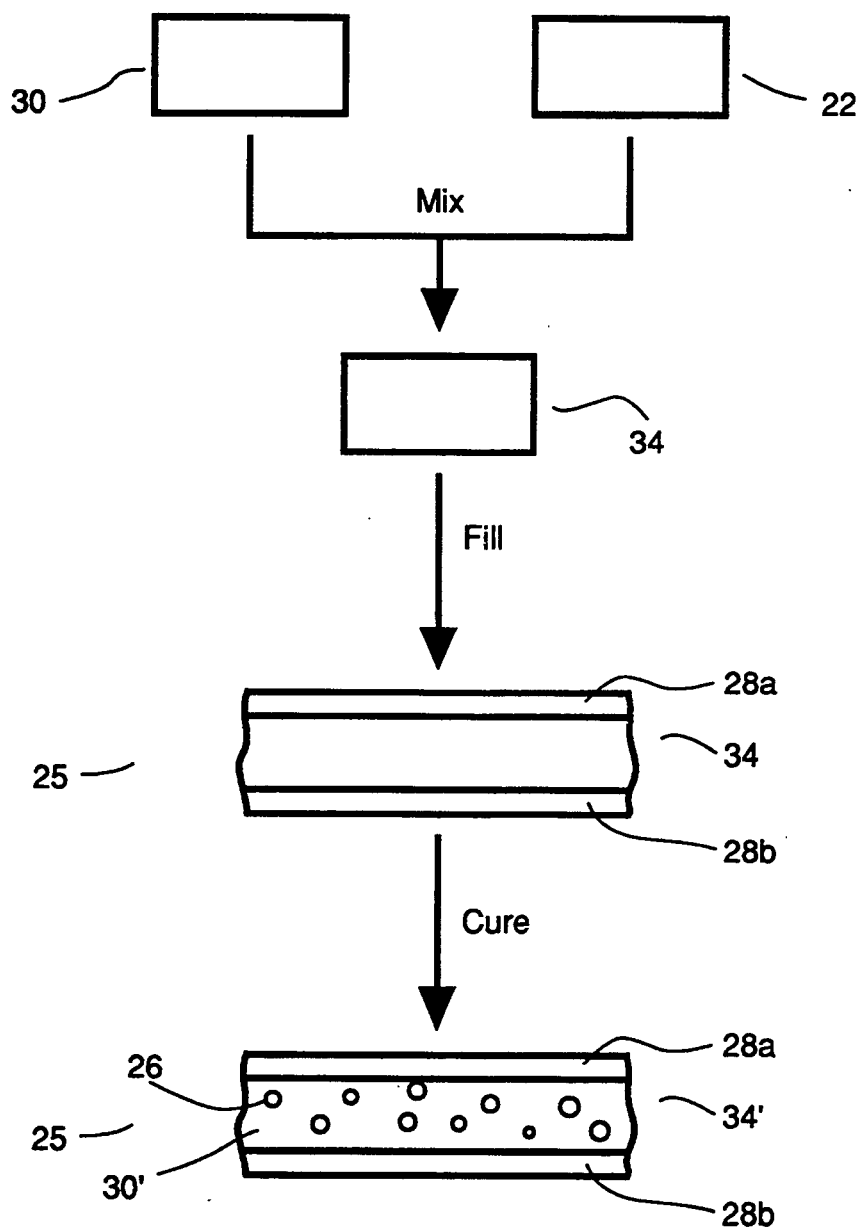
Prior Art
*Fig_3*

METHOD OF MAKING LIQUID CRYSTAL MATERIAL INCLUDING POLYMERIZING DISPERSION OF PREPOLYMER AND LIQUID CRYSTAL WHICH IS IMMISCIBLE IN THE PREPOLYMER

TECHNICAL FIELD OF THE INVENTION

This invention relates to a method of making liquid crystal material, in particular encapsulated liquid crystal material.

BACKGROUND OF THE INVENTION

Liquid crystal displays ("LCD's"), in which the electro-optically active element comprises liquid crystals, are well known in the art. One type of LCD employs an encapsulated liquid crystal material in which a liquid crystal composition is encapsulated or dispersed in many tiny volumes or droplets in a containment medium such as a polymer. When a voltage corresponding to a sufficiently strong electric field is applied across the encapsulated liquid crystal material (the "field-on" condition), the alignment of the liquid crystal molecules is re-oriented in accordance with the field, so that incident light is transmitted. Conversely, in the absence of such a voltage (the "field-off" condition) the alignment of the liquid crystal molecules is random and/or influenced by the liquid crystal-matrix interface, so that the material scatters and/or absorbs incident light.

One method of making encapsulated liquid crystal material is to form an emulsion of the liquid crystal composition in the containment medium, in the presence of a carrier medium such as water. The emulsion is coated onto a substrate and the carrier medium is allowed to evaporate. In this method, the containment medium is normally in a fully polymerized form when the emulsion is formed. Illustrative disclosures include Fergason, U.S. Pat. No. 4,435,047 (1984); Fergason, U.S. Pat. No. 4,616,903 (1986); Fergason et al., U.S. Pat. No. 4,950,052 (1990); Pearlman, U.S. Pat. No. 4,992,201 (1991); and Ma et al., U.S. Pat. No. 5,506,898 (1991).

Another method of making encapsulated liquid crystal material is generally referred to as the phase separation method: an initially homogeneous combination of the liquid crystal composition and containment medium (or precursor thereof) thereof) is prepared and then phase separation of the liquid crystal composition is induced by altering the ambient conditions, to form the encapsulated liquid crystal material. In the variation known as temperature-induced phase separation, the liquid crystal composition is dissolved in the containment medium at an elevated temperature. Upon cooling, the liquid crystal composition becomes less soluble and phase separates. In the variation known as solvent-induced phase separation, a solution of the liquid crystal composition and containment medium in a solvent is prepared. As the solvent is allowed to evaporate, the solubility of the liquid crystal composition decreases, and phase separation occurs. In the variation known as polymerization-induced phase separation, a solution of the liquid crystal composition in a precursor of the containment medium is formed. The precursor is allowed to polymerize to form the final containment medium. As polymerization proceeds, the solubility of the liquid crystal composition decreases and phase separation occurs. Illustrative disclosures include Wu et al., U.S. Pat. No. 4,671,618(1987); West et al., U.S. Pat. No. 4,673,255 (1987); West et al., U.S. Pat. No. 4,685,771 (1987); Doane et al., U.S. Pat. No. 4,688,900 (1987); Vaz et al., U.S. Pat. No. 4,728,547 (1988); Doane et al., U.S. Pat. No. 4,994,204 (1991); West, U.S. Pat. No. 5,004,323 (1991); and Arai et al., EP 0,313,053 A2 (1989).

Other disclosures of interest include Churchill et al., U.S. Pat. No. 3,600,060 (1971); Cartmell et al., U.S. Pat. No. 3,720,623 (1973); Benton et al., U.S. Pat. No. 3,872,050 (1975); Taylor, U.S. Pat. No. 3,935,337 (1976); Taylor, U.S. Pat. No. 4,101,207 (1978); Benton et al., U.S. Pat. No. 4,182,700 (1980); and Benton et al., U.S. Pat. No. 4,246,302 (1981).

The prior art methods suffer from a number of limitations. The requirement for removal of the carrier medium or solvent precludes the preparation of LCD's by "cell-fill" when an emulsion or solvent-induced phase separation process is used. (In a cell-fill technique, the encapsulated liquid crystal material is introduced (e.g., by capillary or vacuum action) into the narrow gap of a preformed LCD cell.) Rather, a sequence of coating, solvent removal, and lamination steps must be used.

Polymerization- and temperature-induced phase separation are in theory compatible with the cell-fill technique, but once the phase separation process has begun, it is difficult to stop or control. The size and size distribution of the liquid crystal droplets or volumes has a marked effect in the performance characteristics of the resulting LCD. It has been remarked that control of size distribution is poor in LCD's prepared by the phase separation process (Vaz et al., SPIE Vol. 1455, Liquid Crystal Devices and Materials (1991), pp. 110-121).

This invention provides a novel method of making encapsulated liquid crystal materials solving the aforementioned limitations.

SUMMARY OF THE INVENTION

This invention provides a method of making an encapsulated liquid crystal material which comprises a liquid crystal composition dispersed in a containment medium and is responsive to an applied electric field to transform from a first visual state to a second visual state, which method comprises the steps of:
(a) providing a liquid crystal composition having an ordinary and an extraordinary refractive index;
(b) providing a prepolymer material in which the liquid crystal composition is substantially immiscible and which is polymerizable into a containment medium having a refractive index which is substantially matched with the ordinary refractive index of the liquid crystal composition;
(c) forming a dispersion of the liquid crystal composition in the prepolymer material, the dispersion having a mean volume diameter of less than 20 $\mu$m; and
(d) polymerizing the prepolymer material to form the encapsulated liquid crystal material.

BRIEF DESCRIPTION OF THE DRAWING(S)

FIGS. 1a-b show the operation of an encapsulated liquid crystal LCD.

FIGS. 2 and 3 are flow diagrams comparing the method of this invention against a prior art method.

DESCRIPTION OF THE PREFERRED EMBODIMENTS

In an encapsulated liquid crystal material, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase. "Liquid crystal composition" or "liquid crystals" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal composition is nematic or operationally nematic. More preferably, it also has a positive dielectric anisotropy.

Individual liquid crystal molecules typically have elongated shapes, with a tendency to align themselves with their long molecular axes parallel to each other. This alignment causes a liquid crystal composition to be anisotropic, meaning that its measured physical, optical, and other properties are dependent on the direction of measurement (parallel or perpendicular to the direction of alignment). The alignment direction may be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

Typically, an encapsulated liquid crystal material is substantially non-transparent in the absence of an electric field (the "field-off" state) and substantially transparent in the presence of a sufficient electric field (the "field-on" state). The electric field induces a change in the alignment of the liquid crystal molecules in the liquid crystal composition, in turn causing the encapsulated liquid crystal material to switch from a highly light-scattering (and/or absorbent) state to a highly non-scattering (and/or non-absorbent) and substantially transparent state. Generally, it is preferred that the liquid crystal composition have a positive dielectric anisotropy and that the ordinary refractive index of the liquid crystal composition be substantially matched with the refractive index of the containment medium, while the extraordinary refractive index is substantially mismatched therewith. The refractive indices are said to be substantially matched when the absolute difference between the refractive index of the containment medium and the ordinary refractive index of the liquid crystal composition is less than 0.10, preferably less than 0.04. There is further scattering which may occur due to the different liquid crystal alignments in neighboring droplets. If this is the dominant mode of scattering, the requirement for refractive index matching may be relaxed. In those portions of the encapsulated liquid crystal material to which a sufficient electric field is applied, the transition from a non-transparent state to a transparent state occurs, while adjacent areas to which no electric field has been applied remain non-transparent.

The principle of operation of an encapsulated liquid crystal material is illustrated in FIGS. 1a–b (like numerals referring to like elements). Encapsulated liquid crystal material 8 comprises a containment medium 10 having distributed therein plural volumes of liquid crystal composition 11 and is positioned between top and bottom electrodes 12 and 13, made for example of indium tin oxide ("ITO") or a thin metal coating. Top and bottom electrodes 12 and 13 (together with encapsulated crystal material 8) may be supported by respective top and bottom support sheets, not shown. The support sheets may be made of a transparent material such as glass or polymer (preferably poly(ethylene terephthalate) ("PET")). A voltage source 14 is connected to electrodes 12 and 13, but with switch 15 in the open position (FIG. 1a), no voltage is applied across encapsulated liquid crystal material 12. Incident light (ray A) is scattered, both backward (rays a' and a") and forward (rays b' and b"). When switch 15 is closed (FIG. 1b), a voltage is applied across encapsulated liquid crystal material 8, causing molecules in liquid crystal composition 11 to align their long molecular axes with the field of the applied voltage. Owing to the match between the refractive index of containment medium 10 and the ordinary refractive index of liquid crystal composition 11, incident light (ray A) is not scattered, but is transmitted through encapsulated liquid crystal material 8.

An anisotropic property of liquid crystals is the dielectric constant ($\epsilon$), having two principal values, one perpendicular ($\epsilon_\perp$) to the long molecular axis and one parallel ($\epsilon_\parallel$) to the long molecular axis. An average dielectric constant ($\epsilon_{avg}$) may be calculated, which is conventionally a weighted average (See, e.g., Weber et al., Liq. Crystals, Vol. 5, No. 5, pp. 1381–1388 (1989)):

$$\epsilon_{avg} = \frac{2\epsilon_\perp + \epsilon_\parallel}{3}$$

The liquid crystal composition also preferably has a large optical anisotropy $\Delta n$ (the difference between its ordinary and extraordinary refractive indices), also called the birefringence. A large $\Delta n$ leads to more scattering in the field-off state, resulting in a display with higher contrast. Since the ordinary refractive index of the liquid crystal composition generally is substantially matched to the refractive index of the containment medium, a larger $\Delta n$ also means a larger difference between the latter and the extraordinary refractive index of the liquid crystal material. This latter difference affects the field-off scattering, with larger amounts of scattering being associated with larger differences. Preferably, $\Delta n$ is greater than 0.15, more preferably between 0.20 and 0.30. Optical anisotropy may be measured by the method of Finkenzeller at al., "Physical Properties of Liquid Crystals: IV. Optical Anisotropy," The Merck Group Liquid Crystal Newsletter, No. 5 (October 1989).

In the method of this invention, the liquid crystal composition is initially dispersed in a prepolymer material in which the former is substantially immiscible. The liquid crystal composition is deemed to be substantially immiscible when, if the liquid crystal composition is brought in contact with the prepolymer material, the solubility of liquid crystal composition is less than 50% by weight, based on the combined amounts of prepolymer material and liquid crystal composition in the prepolymer material phase. The solubility is preferably less than 20%, more preferably less than 10%. The dispersion may be made with apparatus such as propeller blade mixers, colloid mixers, and the like, or even by manual stirring. Because there is no carrier medium or solvent present which must subsequently evaporated, this invention is compatible with the preparation of LCD's by cell-fill techniques. Accordingly, in a preferred aspect of this invention, the prepolymer material-liquid crystal composition mixture contains less than 5% by weight of solvent or carrier medium.

The present invention is well-suited for good droplet or volume size distribution control. One may prepare the dispersion, determine the size distribution, and if the desired size distribution has not been attained, continue the dispersion process until it has been attained. For instance, one may obtain smaller volume sizes of the liquid crystal composition by employing longer mixing times and/or higher shear rates.

The method of this invention may be further understood by reference to the flow diagram in FIG. 2. Liquid crystal composition 22 and prepolymer material 20, in which liquid crystal 22 is substantially insoluble, are mixed together to form an inhomogeneous mixture (dispersion) 24 of droplets 24 of liquid crystal composition in prepolymer material 20. Dispersion 24, which is still fluid, may now be used to fill pre-fabricated liquid crystal cell 25, filling up the space between electrodes 28a and 28b. Then, prepolymer material 20 is cured, to convert it into containment medium 20' and dispersion 24 into the final encapsulated liquid crystal material 24'.

The flow diagram of FIG. 3 provides a comparison against a prior art polymerization-induced phase separation process. Liquid crystal 22 is combined with a precursor material 30 in which the former is soluble to form a homogeneous solution 34. Liquid crystal cell 25 is filled with solution 34, which is still in its homogeneous state. Polymerization is initiated, and during the polymerization droplets 26 of liquid crystal 22 phase separate out as conversion of precursor material 30 to the final containment medium 30' occurs. Because droplet formation occurs during the polymerization process and within the narrow confines of cell 25, it is difficult to control or "fine-tune" the particle size distribution. In contrast, in the method of this invention, droplets of liquid crystals are already formed at the stage of dispersion 24, at which time the possibility of "fine-tuning" the particle size distribution remains.

Pleochroic dyes have been mixed with liquid crystals to form a solution therewith. The pleochroic dye molecules generally align with the liquid crystal molecules, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination provides a mechanism for the controlled attenuation of light by absorption. (Thus, as used herein, the term "liquid crystal composition" or "liquid crystals" also means, in context, the same further containing pleochroic dye dissolved therein.) Pleochroic dyes may be used in encapsulated liquid crystal materials to form colored displays. A display capable of displaying colored images may be formed by depositing side by side red, blue, and green pixels made from encapsulated liquid crystal materials of the corresponding color.

This invention is particularly suitable for the inclusion of pleochroic dyes. It is important that the pleochroic dye be distributed as much as possible in the liquid crystal phase instead of the containment medium phase, to provide enhanced contrast. Where, as here, the liquid crystal composition is substantially insoluble in both the prepolymer material and the resultant containment medium, the pleochroic dye will tend to partition preferentially in the liquid crystal phase. A drawback of phase separation methods is that there is considerable partitioning of the pleochroic dye into the containment medium, believed to be a reflection of the system's initially homogeneous state, in which the liquid crystal and the pleochroic dye are both highly miscible with the containment medium.

Solubility parameters may be used to estimate if a liquid crystal composition will be substantially immiscible in a prepolymer material. Generally, liquid crystal compositions have solubility parameters in the range between 9 and 11 $(J/cm^3)^{\frac{1}{2}}$. To obtain substantial immiscibility, the prepolymer material should have a solubility parameter which differs from that of the liquid crystal composition by at least 2 units.

Generally, the proportion of liquid crystal composition to containment medium is not critical. Typically, a liquid crystal composition to containment medium weight ratio of between about 40:60 and about 80:20 is suitable.

The polymerization of the prepolymer material into the final containment medium may be initiated by light (especially UV light), heat, radiation (especially electron beam radiation) or by the addition of a curing agent. Until the initiation of the polymerization process, the dispersion can be made to be storage-stable for moderate periods of time.

Many different types of polymerization chemistry and prepolymer materials may be used. Since it is desirable to avoid the generation of volatiles which would have to be removed, it is preferred to use addition polymerization instead of condensation polymerization. The prepolymer material may be monomeric or oligomeric. The important aspect is that it is sufficiently fluid prior to polymerization and then may be polymerized to the final state by the reaction of reactive functionalities therein. Prepolymer material may have acrylate, methacrylate, vinyl, allyl, diene, or other unsaturated carbon-carbon functionality. The polymerization by the reaction of an isocyanate functionality with an amine, alcohol, or thiol functionality may also be employed. Other suitable polymerization chemistry includes the reaction of a vinyl group with a silyl hydride group (e.g., where the prepolymer and the containment medium are polysiloxanes); the reaction of an acid anhydride or other active ester functionality with an alcohol or amine; the reaction of an aziridine functionality with a carboxylate functionality; and the reaction of an epoxy functionality with a carboxylate, alcohol, amine, or other functionality. In instances in which two functionalities are mutually reactive upon contact, the dispersion of the liquid crystal material in prepolymer material having one of the functionalities only is prepared. Then, a second prepolymer component having the complementary functionality is added, initiating the polymerization process. In yet other embodiments, the prepolymer material may contain polybutadiene or polyisobutylene units. The polymerization may be carried out either to give linear or crosslinked systems.

Surface active agents or emulsifiers may optionally be added to lower the shear needed to create a desired droplet size distribution or to stabilize the dispersion which is formed. Steric stabilizers such as block copolymers may be used for this purpose.

The encapsulated liquid material may contain an additive means which enhances its electro-optical characteristics, as taught in copending, commonly assigned application Ser. No. 08/028,497, filed Mar. 9, 1993, of Wartenberg et al, the disclosure of which is incorporated by reference.

A preferred LCD is of the active matrix type, in which each pixel (or picture element) is driven (switched from one visual state to another) by an active switching element such as a thin film transistor ("TFT"), varistor, diode, or metal-insulator-metal element ("MIM"). The switching element helps eliminate cross-talk and maintain an initially applied voltage across the corresponding pixel, even when it is not being actively addressed, so that the pixel stays "on" while other pixels are addressed. The longer the pixels holds the initially applied voltage, the longer it can be maintained in the "on" state until it is next addressed, permitting the construction of displays having a larger number of pixels. If the matrix contains a sufficiently large number of switching elements of sufficiently small size, high resolution displays are possible. Active matrix displays are important for television, computer, and instrument screens. Active matrix displays employing liquid crystal materials are disclosed in Becker et al., U.S. Pat. No. 5,124,822 (1992), and Kamath et al., U.S. application Ser. No. 07/806,573, filed Dec. 12, 1991, the disclosures of which are incorporated herein by reference.

For active matrix displays, the liquid crystal composition preferably has an $\epsilon_{avg}$ greater than 5 (at 1 kHz and 25° C.). It is especially preferred that $\epsilon_{avg}$ is between about 5 and about 10, most preferably between about 6 and about 10. Dielectric constants and dielectric anisotropy may be measured by the method of Finkenzeller et al., "Physical Properties of Liquid Crystals: III. Dielectric Permittivities," The Merck Group Liquid Crystal Newsletter, No. 4 March 1989).

Another preferred characteristic of liquid crystal compositions for active matrix displays is a low cyano content, i.e., less than 1.8 meq/g cyano groups (more preferably less than 0.5 meq/g). It is especially preferred that the liquid crystal composition be substantially free of cyano groups or consists essentially of compounds free of cyano groups. Preferred liquid crystal compositions are disclosed in Kamath et al., U.S. application Ser. No. 07/806,573, filed Dec. 12, 1991, the disclosure of which is incorporated herein by reference. Other suitable liquid crystal compositions are disclosed in Fergason, U.S. Pat. No. 4,616,903 (1986); Coates et al., WO 91/05029 (1991); and Arai et al., EP 0,313,053 A2 (1989), the disclosures of which are also incorporated herein by reference.

For active matrix displays, it is also preferred that the liquid crystal composition comprises fluorinated and/or chlorinated liquid crystal compounds, such that the overall composition has a fluorine and/or chlorine content greater than 2.0 meq/g, preferably between 2.0 and 10.0 meq/g. It is especially preferred that the halogen is fluorine.

Encapsulated liquid crystal materials made according to this invention also may be used for privacy panels, sun roofs, windows, signs, and other applications in which a partition is alternatively made transparent or not, to provide permit or not permit viewing therethrough.

The practice of this invention may be further understood by reference to the following examples, which are provided by way of illustration, and not of limitation.

EXAMPLE 1

This example illustrates the invention in an embodiment in which the prepolymer material is cured by urea chemistry. An isocyanate prepolymer (1.72 g, Desmodur E-41, based on isophorone diisocyanate, MW approximately 1050) was added into a small beaker together with liquid crystal composition (1.87 g, E7 from Merck Ltd.). The mixture was mixed with a rotary mixer for 5 min, yielding a cloudy dispersion. A drop of the dispersion was placed onto an ITO-coated glass slide. A droplet of trifunctional amine curing agent (Jeffamine T403) was added and quickly mixed by manual stirring. A second ITO-coated glass slide was placed on top and the curing was allowed to proceed at room temperature. When an AC voltage of 60 V was applied to the cured sample, it went from opaque to transparent.

EXAMPLE 2

This example illustrates an embodiment of the invention in which polymerization of the prepolymer material is initiated photochemically. Acrylated polybutadiene (1 g, Sartomer CN300), 1,1,1-trimethylolpropane triacrylate (0.20 g), photoinitiator (0.10 g, Esacure TZT), nonylphenol ethoxylate (0.03 g, Igepal CO-210, GAF), and liquid crystal composition (2.1 g, E7 from Merck Ltd.) were combined in a vial. The materials were agitated in a vortex mixer to form a dispersion of the liquid crystal composition. The dispersion was placed in a cell made from ITO-coated glass sheets equipped with 20 $\mu$m spacers to hold the glass apart. The cell was placed in an UV light source for 10 min. The cell was then tested by applying a voltage to it, upon which it turned transparent at a relatively low field (about 1 V/$\mu$m).

What is claimed is:

1. A method of making an encapsulated liquid crystal material which comprises a liquid crystal composition dispersed in a containment medium and is responsive to an applied electric field to transform from a first visual state to a second visual state, which method comprises the steps of:
   (a) providing a liquid crystal composition having an ordinary and an extraordinary refractive index;
   (b) providing a prepolymer material in which the liquid crystal composition is substantially immiscible and which is polymerizable into a containment medium having a refractive index which is substantially matched with the ordinary refractive index of the liquid crystal composition;
   (c) forming a dispersion of the liquid crystal composition in the prepolymer material, the dispersion having a mean volume diameter of less than 20 $\mu$m; and
   (d) thereafter polymerizing the prepolymer material to form the encapsulated liquid crystal material.

2. A method according to claim 1, wherein the solubility parameter of the prepolymer material differs from that of the liquid crystal composition by at least 2 units.

3. A method according to claim 1, wherein the miscibility of the liquid crystal composition in the prepolymer material is less than 50%.

4. A method according to claim 1, wherein the liquid crystal composition includes a pleochroic dye.

5. A method according to claim 1, wherein the polymerization of the prepolymer material is initiated by UV light.

6. A method according to claim 1, wherein the polymerization of the prepolymer material is initiated by heat.

7. A method according to claim 1, wherein the polymerization of the prepolymer material is initiated by the addition of a curing agent.

8. A method according to claim 1, wherein the prepolymer material contains acrylate, methacrylate, vinyl, allyl, diene, or other unsaturated carbon-carbon functionality.

9. A method according to claim 1, wherein the prepolymer material contains vinyl and silyl hydride functionalities.

10. A method according to claim 1, wherein the prepolymer material contains isocyanate functionality.

11. A method according to claim 1, wherein the prepolymer material contains epoxy functionality.

12. A method according to claim 1, wherein the prepolymer material contains polybutadiene or polyisobutylene units.

13. A method according to claim 1, wherein the liquid crystal composition has a cyano content of less than 0.5 meq/g.

14. A method according to claim 1, wherein the liquid crystal composition has a fluorine and/or chlorine content greater than 2.0 meq/g.

15. A method according to claim 1, wherein the liquid crystal composition has an optical anisotropy $\Delta n$ greater than 0.15.

* * * * *